Figure 1:
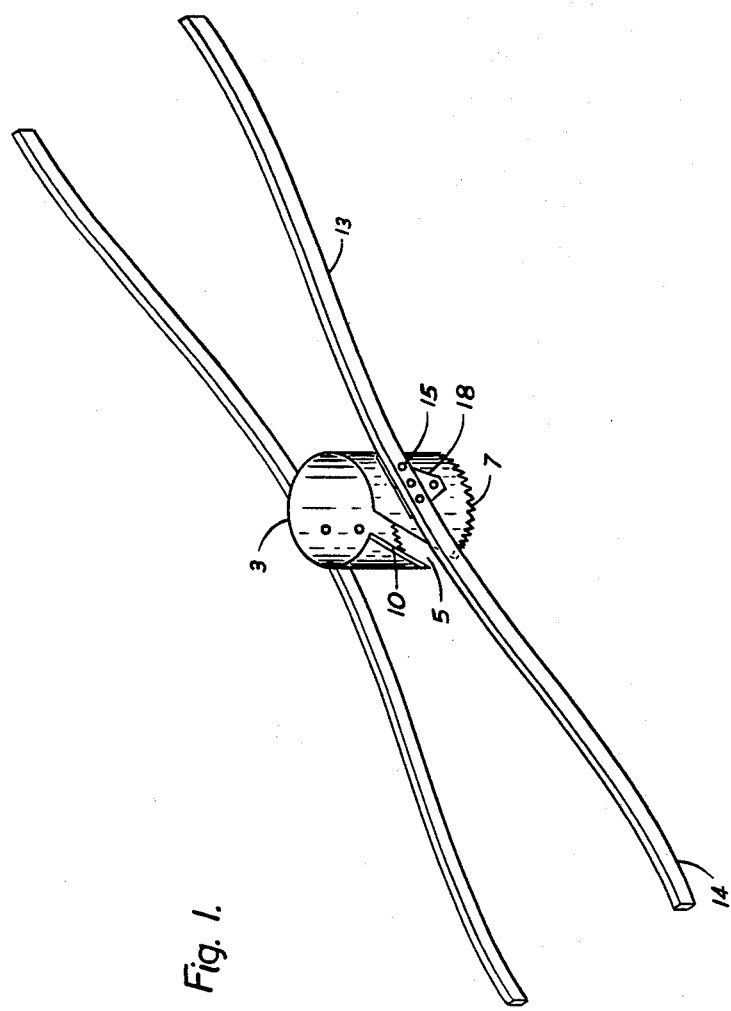

United States Patent [19]
Kovach

[11] 4,402,137
[45] Sep. 6, 1983

[54] SINGLE ELEMENT CORN EAR STRIPPER

[76] Inventor: Bruce F. Kovach, 5918 Radnor, Detroit, Mich. 48224

[21] Appl. No.: 420,263

[22] Filed: Sep. 20, 1982

[51] Int. Cl.³ .............................................. A47J 17/02
[52] U.S. Cl. ..................................... 30/121.5; 30/283; 30/316
[58] Field of Search ....................... 30/316, 283, 121.5

[56] References Cited

U.S. PATENT DOCUMENTS

| | | | |
|---|---|---|---|
| 1,515,000 | 11/1924 | Thompson | 30/316 |
| 2,188,020 | 1/1940 | Tewell | 30/121.5 |
| 2,297,565 | 9/1942 | Kors | 30/316 |
| 2,511,933 | 6/1950 | McNair | 30/121.5 |
| 3,077,909 | 2/1963 | Trenor | 30/283 |

Primary Examiner—Frederick R. Schmidt
Assistant Examiner—J. T. Zatarga

[57] ABSTRACT

A tool for removing corn kernels from ears of corn comprising a single annular cutting element which forms an arc substantially less than a full circle, however also having an angular opening which causes the annular cutting element to overlap itself longitudinally relative to its axis thus allowing the annular cutting element to cut all of the kernels of an ear of corn in one stroke even though it doesn't form a complete circle. The annular cutting element further has two handles which are secured to the annular cutting element opposite each other and on either side of the angular opening in such a way that they can be manipulated in order to increase or decrease the diameter of the annular cutting element in order to accomodate different ear sizes.

2 Claims, 1 Drawing Figure

SINGLE ELEMENT CORN EAR STRIPPER

FIELD OF THE INVENTION

This invention relates to a hand operated corn-cutter for removing kernels of corn from an ear of corn in an uncooked or cooked condition.

DISCUSSION OF PRIOR ART

The most popular corn-cutter currently on the market which can remove all the kernels of corn from a cob with one stroke of the tool comprises two annular overlapping cutting elements, each one forming an arc of substantially more than 180° of a circle which are connected to a u-shaped handle. This tool is adjusted to smaller ears by compressing the u-shaped handle, however it cannot be enlarged to accomodate larger ears so it must be made with a large enough hole to accomodate the larger ears without adjustment. The major disadvantage of this design is that the two annular overlapping cutting elements tend to cut poorly where they overlap, smashing the corn kernels instead of cleanly cutting them away from the corn cob. This also makes the tool hard to push down over an ear of corn.

DRAWINGS

FIG. 1 shows a perspective overall view of the corn stripper.

DESCRIPTION AND OPERATION OF THE PREFERRED EMBODIMENT

In the FIG. 1A the annular cutting element is indicated by the FIG. 3. The annular cutting element 3 is preferably made of stainless steel and must be made of a steel having some springing qualities, or more specifically, is resilient in order to allow the annular cutting element 3 to expand and constrict in order to fit different size ears. The annular cutting element 3 forms an arc substantially less than a full circle, however it also has an angular opening 5, sufficient to allow room for resilient movement of the annular cutting element 3 which causes the annular cutting element 3 to overlap itself longitudinally relative to its axis thus allowing the annular cutting element 3 to cut all the kernels off an ear of corn in one stroke even though it doesn't form a complete circle. A primary cutting edge 7 of conventional teeth, located on and around the bottom edge of the annular cutting element 3 and being integral with it, cuts most of the kernels off the cob and a secondary cutting edge 10 integral with the annular cutting element 3 and located adjacent to and angling over the major portion of the angular opening 5, cuts off the remaining kernels cleanly, without waste, and with less effort than with prior art cutters. The device is operated by two elongated handles 13 which are substantially parallel and diverge toward their ends 14 in order to be comfortably and squeezably held in the user's hands. The handles 13 may be made of rectangular steel rod and are secured to the annular cutting element 3 on either side of the angular opening 5 by rivets 15 and steel struts 18. The struts 18, besides stabilizing the handles 13, also prevent the corn from smashing up against the handles 13. The handles 13 may also be simply welded to the annular cutting element 3 instead of using the rivets 15 and struts 18. Unlike other kernel cutters, the annular cutting element 3 is made to fit perfectly over an average size ear when at rest in which case the user would simply place the tool over the top of the ear in a vertical position and then press down on the handles 13 in order to remove substantially all of the kernels with one downward slicing motion. When a smaller than average ear is encountered the user squeezes the handles 13 on the side of the angular opening 5 to make the annular cutting element 3 smaller in diameter and then repeats the downward stroke. When a larger than average ear is encountered the user squeezes the handles 13 on the side opposite to the angular opening 5 which expands the annular cutting element 3, making it fit over the larger ear. Although minor modifications might be suggested by those versed in the art, it should be understood that I wish to employ within the scope of the patent warranted therein all such modifications as reasonably and properly come within the scope of my contribution to the art.

I claim:

1. A tool for cutting corn kernels from the cob comprising a resilient annular cutting element forming an arc substantially less than a full circle which also has an angular opening large enough to allow resilient movement of the said annular cutting element and which is angled enough to cause the said annular cutting element to overlap itself longitudinally relative to its axes, a primary cutting edge located on and around the bottom edge of the said annular cutting element and being integral with it, a secondary cutting edge integral with the said annular cutting element and located adjacent to and angling over the major portion of the said angular opening, and a holding means secured to the exterior of the said annular cutting element.

2. A tool according to claim 1 where the said holding means comprises two substantially parallel elongated handles which diverge towards their ends in order to be comfortably and squeezably held in the users hands and used to enlarge or constrict the said annular cutting element and which are connected by rivets and struts to the said annular cutting element on either side of the said angular opening.

* * * * *